United States Patent [19]

Gerfast

[11] Patent Number: 4,464,693

[45] Date of Patent: Aug. 7, 1984

[54] SNAP-ACTION CARTRIDGE FOR RECORDING DISC

[75] Inventor: Sten R. Gerfast, Mendota Heights, Minn.

[73] Assignee: Minnesota Mining and Manufacturing Company, St. Paul, Minn.

[21] Appl. No.: 369,904

[22] Filed: Apr. 19, 1982

[51] Int. Cl.³ .............................................. G11B 23/02
[52] U.S. Cl. ..................................... 360/133; 206/444
[58] Field of Search ................... 360/133, 135, 97–98; 206/444

[56] References Cited

U.S. PATENT DOCUMENTS

| | | | |
|---|---|---|---|
| 3,882,701 | 5/1975 | Wirth | 206/444 |
| 4,078,246 | 3/1978 | Berthoux et al. | 360/133 |
| 4,124,866 | 11/1978 | Coleman | 360/133 X |
| 4,184,184 | 1/1980 | Hedin et al. | 360/133 X |

*Primary Examiner*—John H. Wolff
*Attorney, Agent, or Firm*—Donald M. Sell; James A. Smith; David W. Anderson

[57] ABSTRACT

A circular, shape-retaining cover is fastened to the hub of a rigid recording disc to provide a cartridge. The cover rotates with the disc and undergoes snap-action between a normal conical shape enclosing the periphery of the disc and an inverted conical shape providing free access to the recording surface from the entire periphery of the disc.

10 Claims, 6 Drawing Figures

SNAP-ACTION CARTRIDGE FOR RECORDING DISC

TECHNICAL FIELD

The invention concerns a cartridge for a rigid recording disc, especially a magnetic recording disc.

BACKGROUND ART

It is believed that all current rigid magnetic recording discs are permanently protected by a rigid, box-like cartridge. Most such cartridges have a door for access by a recording head or heads, as does the cartridge of U.S. Pat. No. 4,184,184, or a removable cover for access by both a recording head or heads and a drive mechanism, as does the cartridge of U.S. Pat. No. 3,882,701. Because the cartridge should be substantially dust-tight, the door or cover may rub against the housing during opening and closing, and this may generate debris. Cartridges in current use are of rather complex manufacture and expensive.

DISCLOSURE OF INVENTION

The cartridge of the present invention is far less expensive than any of the cartridges for rigid magnetic recording discs currently on the market. Nevertheless, the cartridge of the present invention provides the same advantages as do those of the prior art, including being substantially dust-tight. Unlike some cartridges of the prior art, the rigid recording disc is accessible to the drive mechanism while the cartridge is closed. Unlike most cartridges in current use, the recording disc itself forms a part of the dust-tight housing which is completed by a circular, shape-retaining, sheet-like cover that

- is concentrically fastened to the hub of the recording disc,
- has an annular area which is spaced from the recording surface of the disc and is bistable between
  - a normal generally conical shape, wherein the cover provides a substantially dust-tight enclosure, and
  - an inverted generally conical shape, wherein the cover provides access to the recording surface from the entire periphery of the disc, and
- undergoes snap-action between its normal and inverted conical shapes.

Because the cover rotates with the disc, the centrifugal pumping of air upon their rotation tends to carry away from the cover any debris which otherwise might fall onto the recording surface. There is no debris-producing rubbing between the cover and the remainder of the dust-tight housing.

If the rigid recording disc has two recording surfaces, it may have two snap-action covers. When the recording disc has only one cover, it should in the closed position contact the entire periphery of the disc. When there are two covers, they may when closed contact either the disc periphery or each other beyond the disc periphery to provide a single, essentially dust-proof enclosure around both recording surfaces.

The cover must be constructed of a material which resists fatigue when repeatedly flexed in snap-action between its bistable shapes. Especially useful in this respect are polyvinyl chloride film, polypropylene film and polyethylene terephthalate film. Such films may have thicknesses within the approximate range of 0.1–1.0 mm, preferably 0.25–0.5 mm. When the distance from the hub to the periphery of the recording disc exceeds 5 cm, the thickness of the cover may be in the high end of that preferred range so that the cover has a desirable degree of rigidity. Metal and paper sheets have also been used. A metal sheet may have a thickness of 0.05 to 0.15 mm.

When used to protect a magnetic recording surface, the minimum spacing between the open cover and the recording surface can be as small as about 2 mm, because magnetic recording heads and their supporting arms can be very thin.

The rigid recording disc of the novel cartridge may have a rigid recording surface, as in the aforementioned U.S. Pat. No. 3,882,701 and U.S. Pat. No. 4,184,184, or a flexible recording surface supported by a rigid disc support, as in U.S. Pat. No. 3,373,413 or German Offenlegungsschrift No. 2,342,890. For the latter type, a snap-action cover in the closed position may rest against the periphery of the rigid disc support.

While the present invention is especially useful for protecting the recording surfaces of magnetic recording discs, other typs of recording surfaces are also useful, including electrostatic surfaces and optically-recordable surfaces. The cover for the latter is preferably a transparent plastic which need not be of perfect optical flatness if the beam of energy being used is out of focus whenever it passes through the open cover. Although it might be possible to record or read from the recording surface optically with a transparent cover in the closed position, the cover is preferably in its inverted shape during recording and reading so as to be as far out of focus as possible.

THE DRAWING

Figure 1:
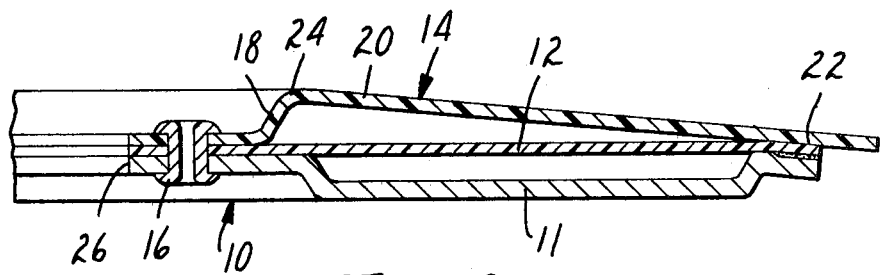
FIG. 1 is a partial schematic central cross-section of a cartridge of the present invention with its cover closed.
Figure 2:
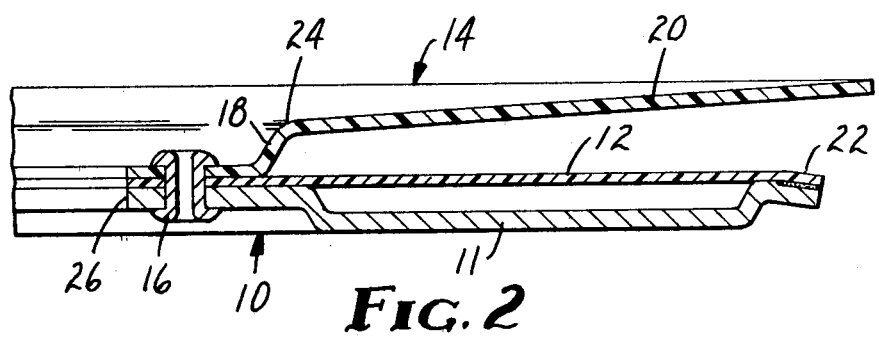
FIG. 2 shows the cartridge of FIG. 1 with its cover open.

The rigid magnetic recording disc 10 shown in FIGS. 1 and 2 consists of a circular rigid metal support 11 having an annular recess across which is stretched a flexible magnetic recording sheet 12 that is adhesively secured to the rim of the support 11. A sheet-like plastic cover 14 is fastened to the hub of the support 11 by three symmetrically positioned rivets or eyelets 16 to provide a cartridge which protects the sheet 12 of magnetic recording tape from damage during handling. At the hub of the circular support, the cover 14 forms an inner inverted cone 18, and radially beyond the inner cone is an annular area 20 which is bistable between the normal conical shape shown in FIG. 1 and the inverted conical shape shown in FIG. 2. When closed as shown in FIG. 1, the cover 14 is spaced from the flexible recording surface of the sheet 12 but contacts the entire rigid periphery 22 of the magnetic recording disc 10, thus providing a substantially dust-tight enclosure immediately above the recording surface. When the edges of the cover 14 are lifted above the recording disc 10 beyond a critical point, the cover flexes along a circle 24 and undergoes snap-action to assume the inverted conical shape of FIG. 2. This permits a magnetic recording head to move into position over the recording surface of the magnetic recording sheet 12. The center of the cover 14 is cut out to permit a spindle to be inserted into a central opening 26 of the circular support 11 for rotationally driving the magnetic recording disc 10.

Figure 3:
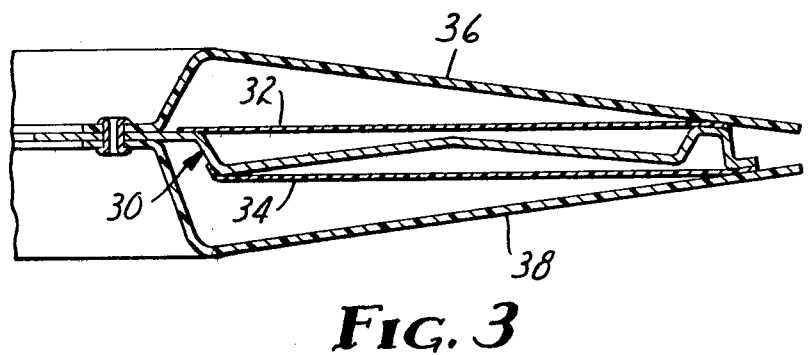
FIG. 3 is a partial schematic central cross-section of a cartridge of the present invention having two covers for two recording surfaces.

The rigid magnetic recording disc 30 shown in FIG. 3 has flexible magnetic recording sheets 32 and 34 stretched across both faces. A pair of sheet-like plastic covers 36 and 38, which are identical to the cover 14, protect both magnetic recording surfaces.

Figure 4:
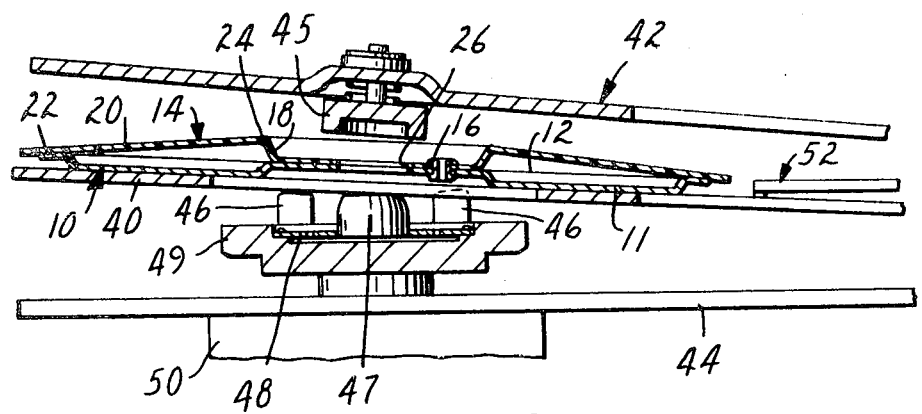
FIG. 4 is a schematic cross-section in a vertical plane centrally through a disc drive into which the cartridge of FIGS. 1 and 2 has been loaded.

Referring to FIG. 4, the cartridge provided by the recording disc 10 and cover 14 has been slidably inserted onto a sloped platform 40 of a framework 42 which is hingedly supported from a deck 44 of a disc drive (hinging not shown). When the framework 42 is pivoted downwardly toward the position shown in FIGS. 5 and 6, a collet 45, which is journalled in the framework 42, contacts the cover 14 at the hub of the rigid metal support 11 and presses the inner surface of the periphery of the cover 14 against four ears 46, thus lifting the cover off the periphery of the recording disc 10 until the cover snaps to its inverted shape. The collet 45 continues to move the metal support 11 downwardly until its central opening 26 fits tightly over a tapered spindle 47 which is mounted on a cleft disc-shaped spring 48 to move axially against the bias of the spring until the metal support 11 fits tightly against a turntable 49. The turntable 49 is driven by a coaxial motor 50 and with it the collet 45 and the entire cartridge. A magnetic head positioning assembly 52 is slidably mounted from the deck 44 (mounting not shown) to move from the retracted position of FIG. 4 into the operative position of FIGS. 5 and 6.

Figure 6:
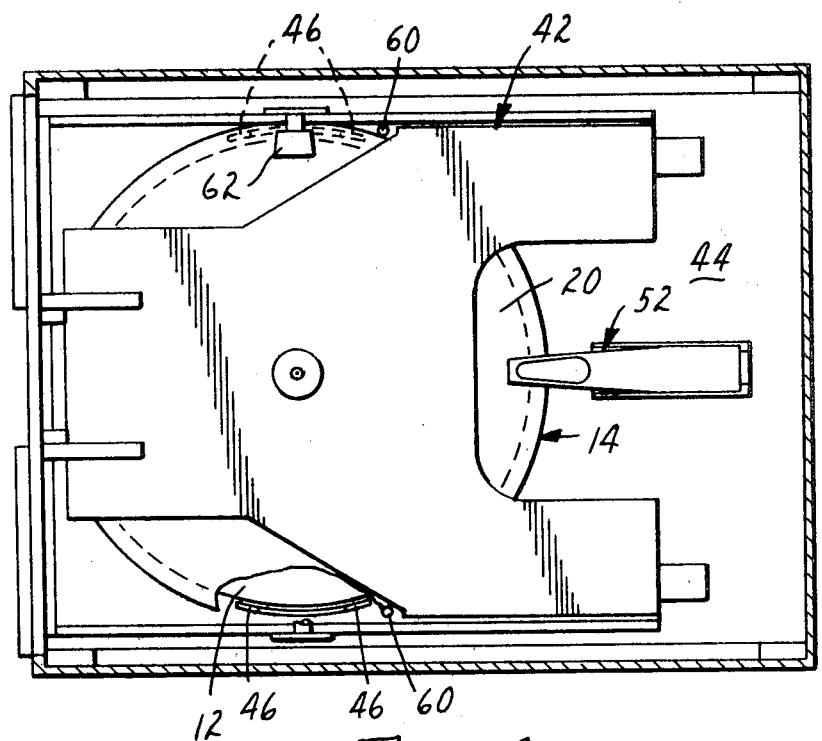
FIG. 6 is a schematic top view of the disc drive of FIGS. 4 and 5 in the operative position.

As seen in FIG. 6, when the cartridge is slidably inserted onto the sloped platform 40, a pair of stops 60 position it so that its central opening 26 is directly above the spindle 47.

To remove the cartridge, the head assembly 52 is retracted, and the framework 42 is pivoted upwardly toward the position of FIG. 4. The outer surface of the periphery of the cover 14 contacts a pair of rollers 62 (FIG. 6), and the area 20 snaps back to its normal conical shape, thus closing the cartridge.

EXAMPLE 1

Figure 5:
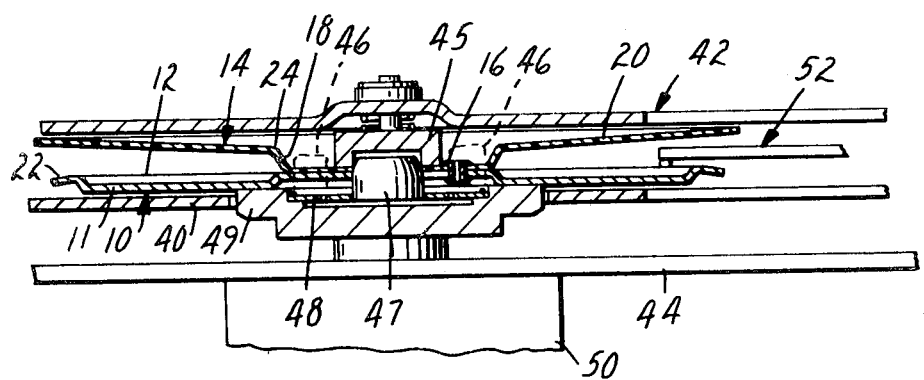
FIG. 5 shows the disc drive of FIG. 4 wherein the cartridge has been moved into operative position.

A snap-action cover as illustrated at 14 of FIGS. 1 and 2 and at 36 and 38 of FIG. 3 was made by cutting out a circular piece of biaxially-oriented polyethylene terephthalate film having a thickness of 0.35 mm, forming it in a press at 175° C., and cooling to room temperature before removing it from the press. After trimming to a diameter of 13 cm, this was used to make a cartridge as illustrated in FIGS. 1 and 2, the metal support of which was 5052 aluminum of 0.7 mm thickness. The cartridge was inserted into a test unit designed as illustrated in FIGS. 4-6 except having no motor. After repeated pivoting to open and close the cover 50,000 times, no wear was revealed, even under microscopic examination of the circle 24 of flexure.

Similar test units were equipped with motors, and tests were carried out using a retractable magnetic head positioning assembly to record onto and read signals from the magnetic recording sheet with good results. The minimum clearance of the cartridge between the cover and the recording surface was about 3 mm.

EXAMPLE 2

A pair of rigid magnetic recording discs 10 were concentrially fastened together back-to-back, and a pair of covers 14 were fastened to the hubs to protect both recording surfaces.

EXAMPLE 3

Cartridges, each having two snap-action covers, were constructed as illustrated in FIG. 3, using the same covers as were used in the cartridges of Example 1. Their metal support was cold-rolled steel of 0.7 mm thickness.

I claim:

1. A cartridge comprising:
    a rigid recording disc having a central hub and a circular rim defining a periphery of said disc;
    a circular cover concentrically fastened to said disc at said hub, said cover including a circular line of flexure adjacent said hub and an annular area radially outward from said line of flexure and being bistable and movable by snap-action between a first stable position of normal conical shape wherein said annular area is spaced from said disc adjacent said hub and contacts the entire periphery of said disc to protect the area of said disc between said hub and said rim and a second stable position of inverted conical shape wherein said annular area is increasingly spaced from said disc radially outward from said line of flexure toward said periphery to provide access to said disc.

2. A cartridge as defined in claim 1 wherein said cover includes a cone between said bistable annular area and said hub.

3. A cartridge according to claim 1 wherein said rigid recording disc has two recording surfaces on opposite sides of said disc, and two covers as defined in claim 1 with one over each recording surface.

4. A cartridge as defined in claim 1 wherein the minimum spacing between said annular area and the surface of said recording disc between said line of flexure and said periphery in said second position is 2 mm.

5. A cartridge as defined in claim 1 wherein said cover is plastic and has a thickness of 0.1 to 1.0 mm.

6. A cartridge as defined in claim 1 wherein said cover is metal and has a thickness of 0.05 to 0.15 mm.

7. In combination, a cartridge as defined in claim 1 and a disc drive including a turntable, means for positioning said cartridge on said turntable, and means for lifting said annular area of said cover from said normal conical shape until said cover snaps to said inverted conical shape as said cartridge is positioned on said turntable.

8. A cartridge and disc drive combination as defined in claim 7 wherein said means for lifting said annular area of said cover comrises a plurality of ears on said disc drive which contact the surface of the periphery of the cover adjacent said disc upon positioning said cartridge on said turntable.

9. A cartridge and disc drive combination as defined in claim 8 further including means for lifting the cartridge from said turntable and means for forcing said annular area of said cover from said inverted conical shape towards said disc until said cover snaps to said normal conical shape.

10. A cartridge and disc drive combination as defined in claim 9 wherein said means for forcing said cover to said normal conical shape comprises a plurality of rollers which contact said cover opposite said disc.

* * * * *